(12) United States Patent
Kilickaya et al.

(10) Patent No.: US 11,481,576 B2
(45) Date of Patent: Oct. 25, 2022

(54) SUBJECT-OBJECT INTERACTION RECOGNITION MODEL

(71) Applicant: QUALCOMM Technologies, Inc., San Diego, CA (US)

(72) Inventors: Mert Kilickaya, Amsterdam (NL); Efstratios Gavves, Amsterdam (NL); Arnold Wilhelmus Maria Smeulders, Amsterdam (NL)

(73) Assignee: Qualcomm Technologies, Inc., San Diego, CA (US)

( * ) Notice: Subject to any disclaimer, the term of this patent is extended or adjusted under 35 U.S.C. 154(b) by 114 days.

(21) Appl. No.: 16/827,592

(22) Filed: Mar. 23, 2020

(65) Prior Publication Data

US 2020/0302232 A1 Sep. 24, 2020

(30) Foreign Application Priority Data

Mar. 22, 2019 (GR) .............................. 20190100141

(51) Int. Cl.
*G06K 9/00* (2022.01)
*G06K 9/62* (2022.01)
*G06N 3/08* (2006.01)

(52) U.S. Cl.
CPC ......... *G06K 9/6256* (2013.01); *G06K 9/6261* (2013.01); *G06K 9/6267* (2013.01); *G06N 3/08* (2013.01)

(58) Field of Classification Search
CPC .. G06K 9/00; G06K 9/62; G06K 9/46; G06K 9/32; G06T 7/00; G06T 5/00; G06T 1/00; G06T 11/00; G06T 7/194; G06T 11/20; G06T 7/11; G06T 7/40; G06T 15/00; G06T 15/08; G06T 17/00; G06T 7/12; G06T 7/136; G06T 7/174; G06T 7/60; G06T 7/73; G06N 3/04; G06N 3/08
See application file for complete search history.

(56) References Cited

U.S. PATENT DOCUMENTS

| 10,529,137 | B1* | 1/2020 | Black .................. G06T 13/40 |
| 2013/0101209 | A1* | 4/2013 | Tian .................... G06F 16/78 382/164 |
| 2018/0075290 | A1* | 3/2018 | Chen ................ G06K 9/00248 |
| 2020/0242345 | A1* | 7/2020 | Huang ................ G06K 9/4604 |

OTHER PUBLICATIONS

Detecting and Recognizing Human-Object Interactions by Georgia et al (Year: 2018).*

(Continued)

*Primary Examiner* — Quan M Hua
(74) *Attorney, Agent, or Firm* — Seyfarth Shaw LLP

(57) ABSTRACT

A method for processing an image is presented. The method locates a subject and an object of a subject-object interaction in the image. The method determines relative weights of the subject, the object, and a context region for classification. The method further classifies the subject-object interaction based on a classification of a weighted representation of the subject, a weighted representation of the object, and a weighted representation of the context region.

28 Claims, 10 Drawing Sheets

(56) References Cited

OTHER PUBLICATIONS

Chao Y W., et al., "Learning to Detect Human-Object Interactions", arxiv.org, Cornell University Library, 201 OLIN Library Cornell University Ithaca, NY 14853, Feb. 17, 2017 (Feb. 17, 2017), XP080746167, 10 Pages, DOI: 10.1109/WACV.2018.00048, Section 3, figures 3,4.

Gkioxari G., et al., "Detecting and Recognizing Human-Object Interactions", 2018 IEEE/CVF Conference on Computer Vision and Pattern Recognition, IEEE, Jun. 18, 2018 (Jun. 18, 2018), pp. 8359-8367, XP033473759, DOI: 10.1109/CVPR.2018.00872, [retrieved on Dec. 14, 2018], Section 3, figures 3, 4.

International Search Report and Written Opinion—PCT/US2020/024338—ISAEPO—dated Jul. 7, 2020.

Zhuang B., et al., "Towards Context-Aware Interaction Recognition for Visual Relationship Detection", 2017 IEEE International Conference on Computer Vision (ICCV), IEEE, Oct. 22, 2017 (Oct. 22, 2017), pp. 589-598, XP033282914, DOI: 10.1109/ICCV.2017.71, [retrieved on Dec. 22, 2017], Section 3, figures 2, 3.

\* cited by examiner

SUBJECT-OBJECT INTERACTION RECOGNITION MODEL

CROSS-REFERENCE TO RELATED APPLICATION

The present application claims priority to Greece Patent Application No. 20190100141, filed on Mar. 22, 2019, and titled "SUBJECT-OBJECT INTERACTION RECOGNITION," the disclosure of which is expressly incorporated by reference herein in its entirety.

BACKGROUND

Field

Aspects of the present disclosure generally relate to subject-object interaction recognition.

Background

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field.

Deep convolutional neural networks (DCNs) are used in various technologies, such as vision systems, speech recognition, autonomous driving, and Internet of Things (IoT) devices. Vison systems may identify an interaction between a subject (e.g., an actor) and an object. During the interaction, the subject acts upon the object in a scene (e.g., context). The subject-object interaction may be denoted as a noun-verb pair, such as horse-riding or cow-milking. It would be desirable to improve an accuracy of interaction recognition systems.

SUMMARY

In an aspect of the present disclosure, a method for processing an image locates a subject and an object of a subject-object interaction in the image. The method also determines relative weights of the subject, the object, and a context region for classification. The method further classifies the subject-object interaction based on a classification of a weighted representation of the subject, a weighted representation of the object, and a weighted representation of the context region.

In another aspect of the present disclosure, an apparatus for processing an image includes at least one processor coupled to the memory and configured to locate a subject and an object of a subject-object interaction in the image. The processor(s) is also configured to determine relative weights of the subject, the object, and a context region for classification. The processor(s) is further configured to classify the subject-object interaction based on a classification of a weighted representation of the subject, a weighted representation of the object, and a weighted representation of the context region.

In yet another aspect, and apparatus for processing an image includes means for locating a subject and an object of a subject-object interaction in the image. The apparatus also includes means for determining relative weights of the subject, the object, and a context region for classification. The apparatus further includes means for classifying the subject-object interaction based on a classification of a weighted representation of the subject, a weighted representation of the object, and a weighted representation of the context region.

In still another aspect, a computer readable medium stores program code for processing an image. The program code is executed by at least one processor and includes program code to locate a subject and an object of a subject-object interaction in the image. The computer readable medium also stores program code to determine relative weights of the subject, the object, and a context region for classification. The computer readable medium further stores program code to classify the subject-object interaction based on a classification of a weighted representation of the subject, a weighted representation of the object, and a weighted representation of the context region.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
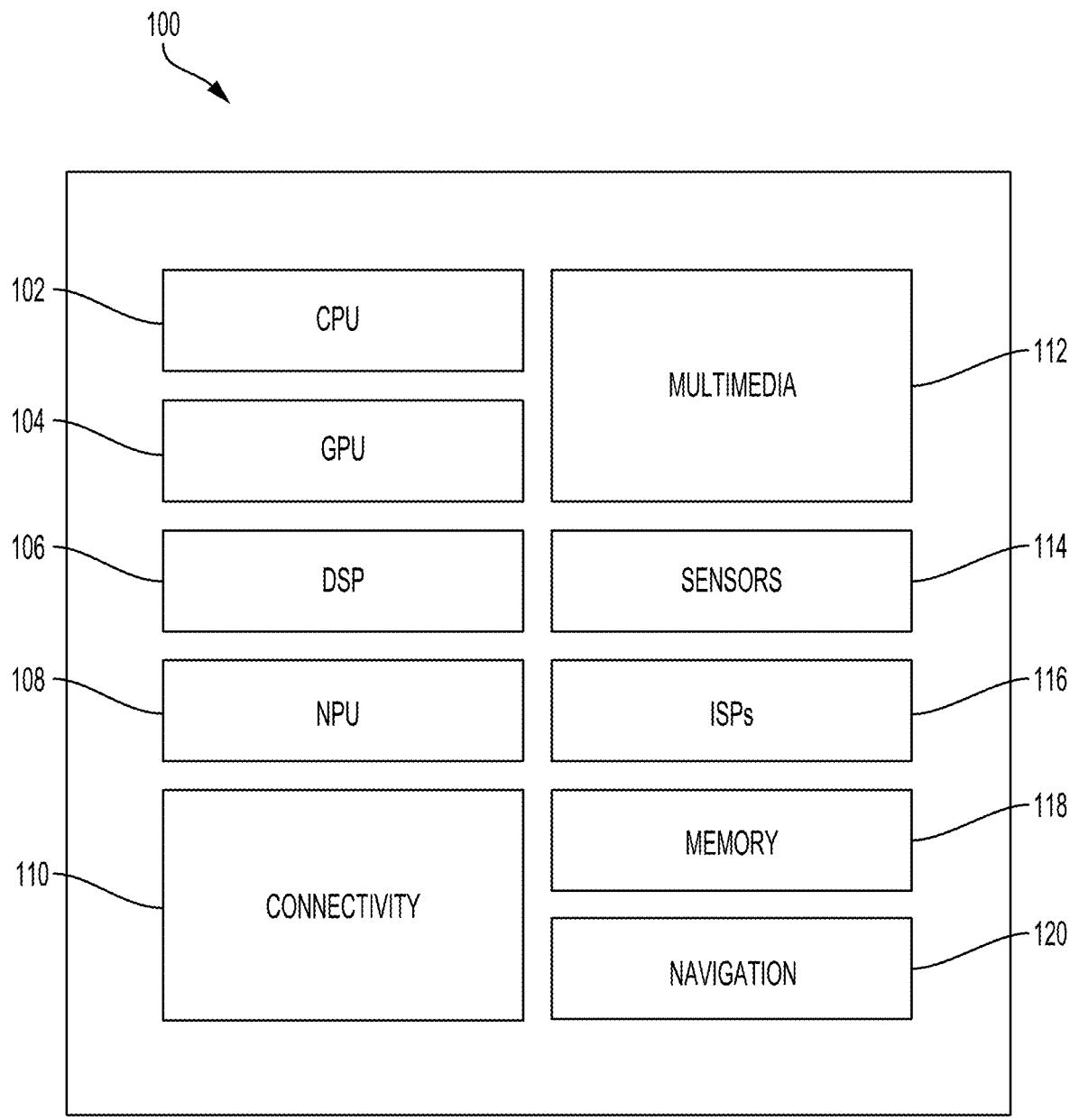
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An interaction recognition system identifies an interaction between a subject (e.g., an actor) and an object. The subject may be referred to as an interactor and the object may be referred to as an interactee. For example, the subject may be a human and the object may be a horse. During an interaction, the subject acts upon the object in a certain scene (e.g., context) to achieve a goal, such as a transportation goal (e.g., riding the horse). The interaction may be denoted as a noun-verb pair, such as horse-riding or cow-milking. Accurate noun-verb pair identification may improve various applications, such as a visual search, indexing, and image tagging.

Convolutional neural networks (CNNs) have improved an accuracy of interaction recognition systems. In some instances, when a target interaction is well documented in a training set, recognition performance may be on par with interaction recognition performed by a human. Still, in a real-world setting, human-object interactions are not limited interactions documented in a training set.

For example, horse riding often occurs in a rural setting or at an equestrian center. Therefore, the training set for horse riding may be limited to examples from a rural setting or an equestrian center. Nonetheless, horse riding may also occur in a city. For example, a police officer may ride a horse within the city. Horse riding in the city may be considered an out-of-context interaction. Although humans may identify the horse riding interaction in the city, an image recognition system may fail to recognize this out-of-context interaction.

The out-of-context interaction refers to a subject-object interaction with limited, or zero, examples in a training set based on context-based training samples. Context-based training samples may include, for example, a skier in the snow, a swimmer in a pool, a basketball player on a basketball court, etc. Aspects of the present disclosure are not limited to human-object interaction identification. Other types of interactions (e.g., subject-object) interactions may be identified.

Conventional CNNs fail to accurately identify out-of-context representations. Moreover, conventional CNNs rely, to an extent, on context to correctly identify a subject, an object, and/or an interaction. Recognition of out-of-context interactions may improve numerous tasks. For example, collision avoidance for a self-driving vehicle may be improved by accurately identifying a horse rider within the city. It is desirable for image interaction recognition systems to identify subject-object interactions without context.

Aspects of the present disclosure are directed to context-free subject-object interaction classifications. In one configuration, a model (e.g., an interaction recognition model) classifies out-of-context subject-object interactions. The model's identification of subject-object interaction regions may be robust to contextual changes. Representations from the subject-object interaction regions may be used to classify an image of the subject-object interaction.

FIG. 1 illustrates an example implementation of a system-on-a-chip (SOC) 100, which may include a central processing unit (CPU) 102 or a multi-core CPU configured for classifying a subject-object interaction from an image in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to locate a subject and an object of an interaction in the image while ignoring at least one of bystanders or background objects. The general-purpose processor 102 may further comprise code to identify relative weights of the subject, the object, and a context for classification. The general-purpose processor 102 may still further comprise code to classify the subject-object interaction based on a classification of a weighted representation of the subject, a weighted representation of the object, and a weighted representation of the context region.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
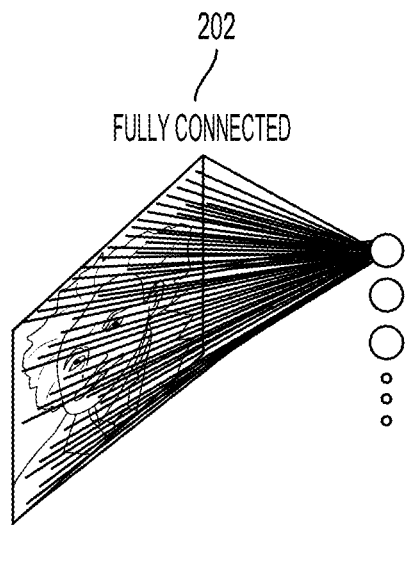
FIGS. 2A, 2B, and 2C are diagrams illustrating a neural network in accordance with aspects of the present disclosure.
Figure 2B:
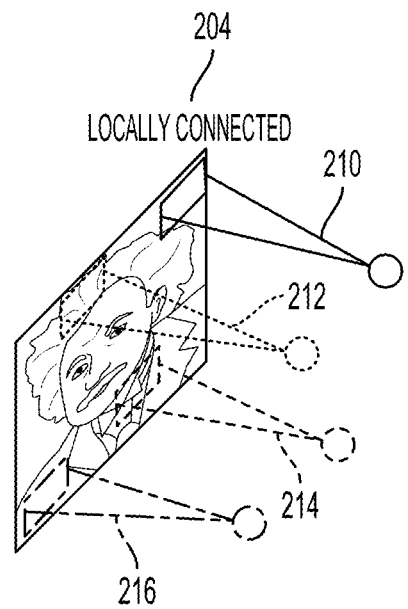

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
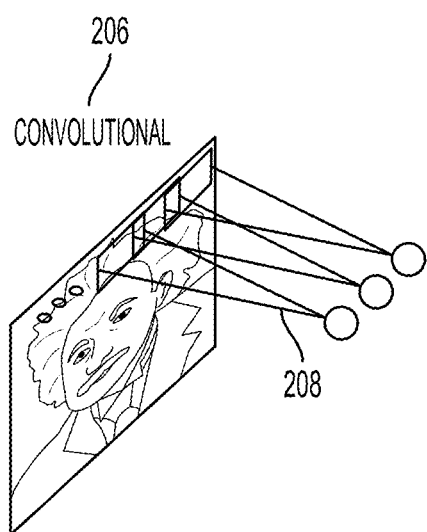

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
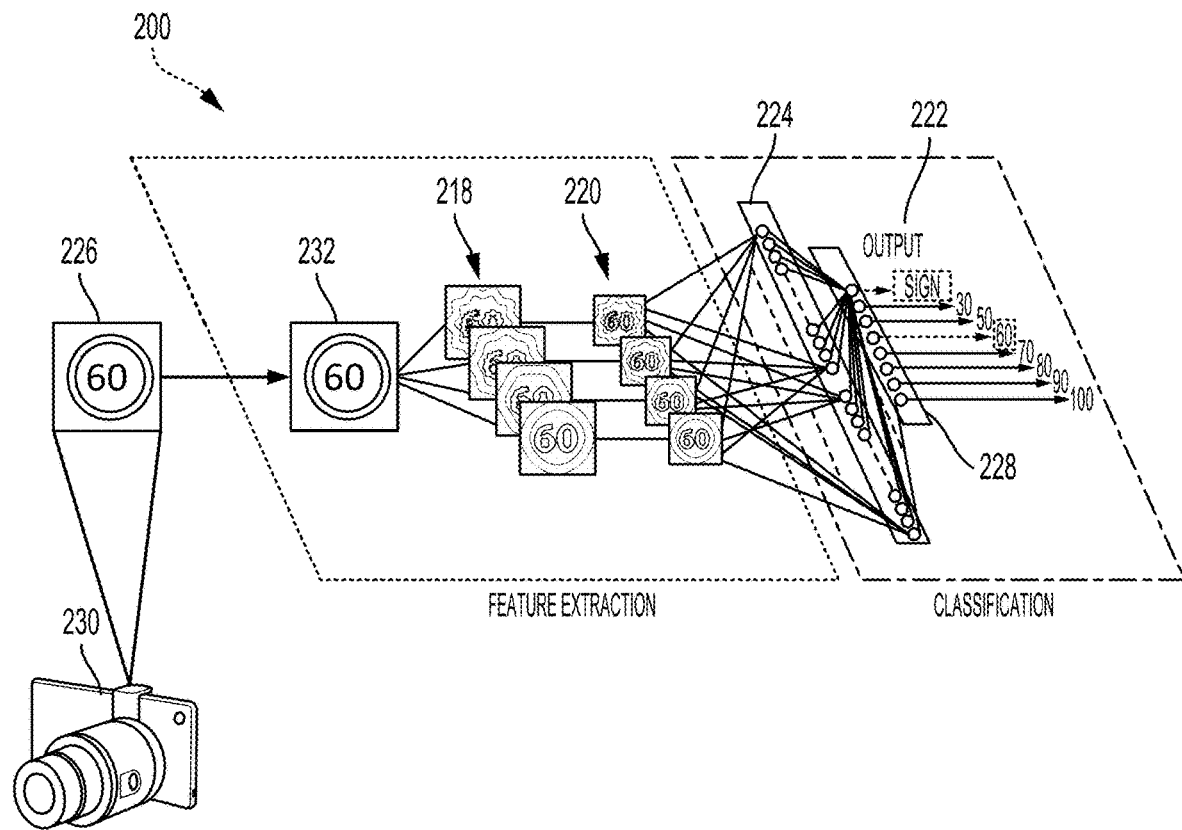
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
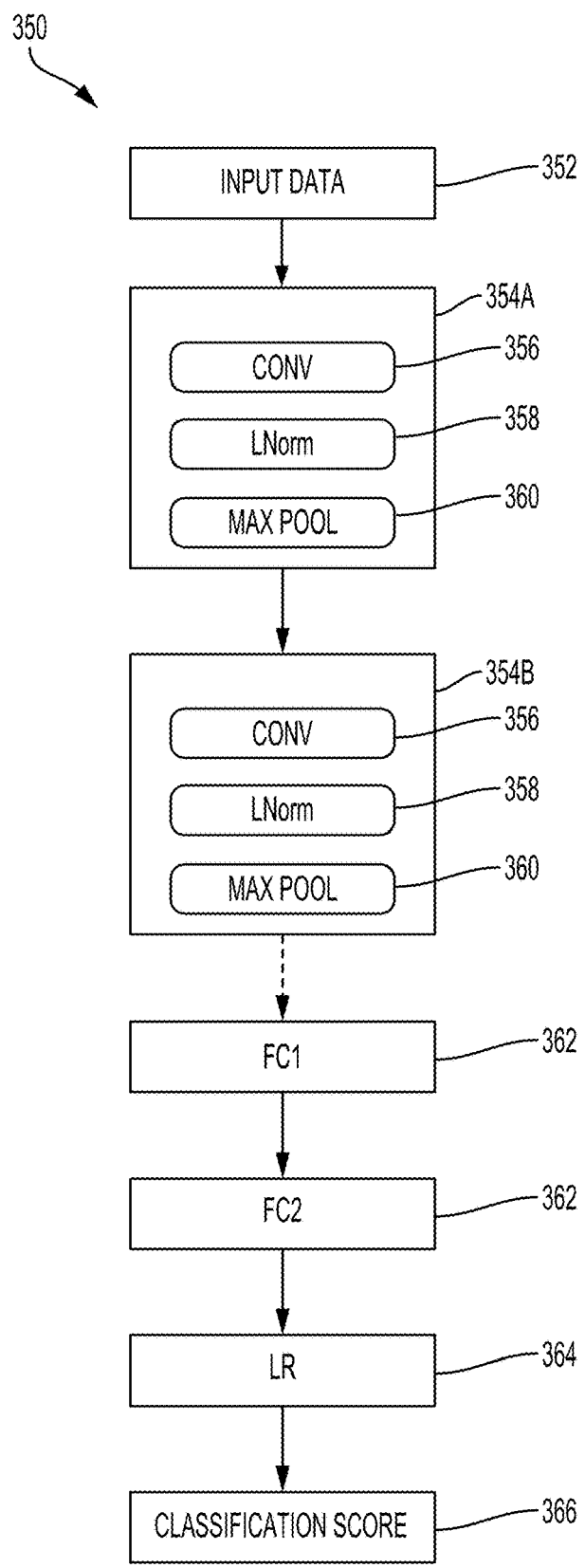
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As discussed, an interaction recognition model may classify a subject-object interaction identified in an image. The interaction may be an out-of-context interaction. The interaction recognition model may locate an interaction between a subject and an object in the image while ignoring bystanders. In one configuration, representations of the subject and the object may be context-free.

That is, subject-object interactions may be identified without regard to context. The model may be trained to represent a context-free subject and a context-free object. The subject and the object localization may be based on previous training. The term context-free may also be referred to as context-neutral or context-agnostic.

Relative weights of the subject, the object, and the context may be identified for classification. The subject-object interaction may be classified based on the weights. For example, an interaction is sampled to create a subject-object-context triplet for entity weighting. The entity weighting provides relative importance for a subject, object, and context.

The model may generate the subject-object-context triplet via a CNN that receives a subject-only image region, an object-only image region, and a context-only image region. The CNN may be a three-stream CNN. The CNN outputs D-dimensional image features or embeddings for each region (e.g., subject, object, and context regions). The D-dimensional image features include D-dimensional activation vectors per subject, object, and context image regions.

For example, a subject-only image region and an object-only image region are masked to generate a context-only image region. As another example, a subject-only image region and a context-only image region are masked to generate an object-only image region. In yet another example, a context-only image region and an object-only image region are masked to generate a subject-only image region.

In one aspect of the disclosure, the model receives the D-dimensional image features of all subjects and/or objects within an image and produces an N×1-dimensional vector denoting a contribution of each region to a final response. N represents a number of detections. The detections refer to subjects and objects detected in an image.

The model computes a weighted aggregation of all subject and/or object activations within an input. For example, object activations are representations of objects detected in the image. An image feature function may produce a D-dimensional activation vector for each object or subject detected in the image. The context is sampled to create a subject-object-context triplet for entity weighting to determine a relative importance of a subject, object, and context for the final classification.

In one example, the model receives 3×D-dimensional image features of the subject-object-context triplet. The model may generate a 3×1-dimensional vector representing a relative importance of the subject, object, and context for the final classification.

Figure 4:
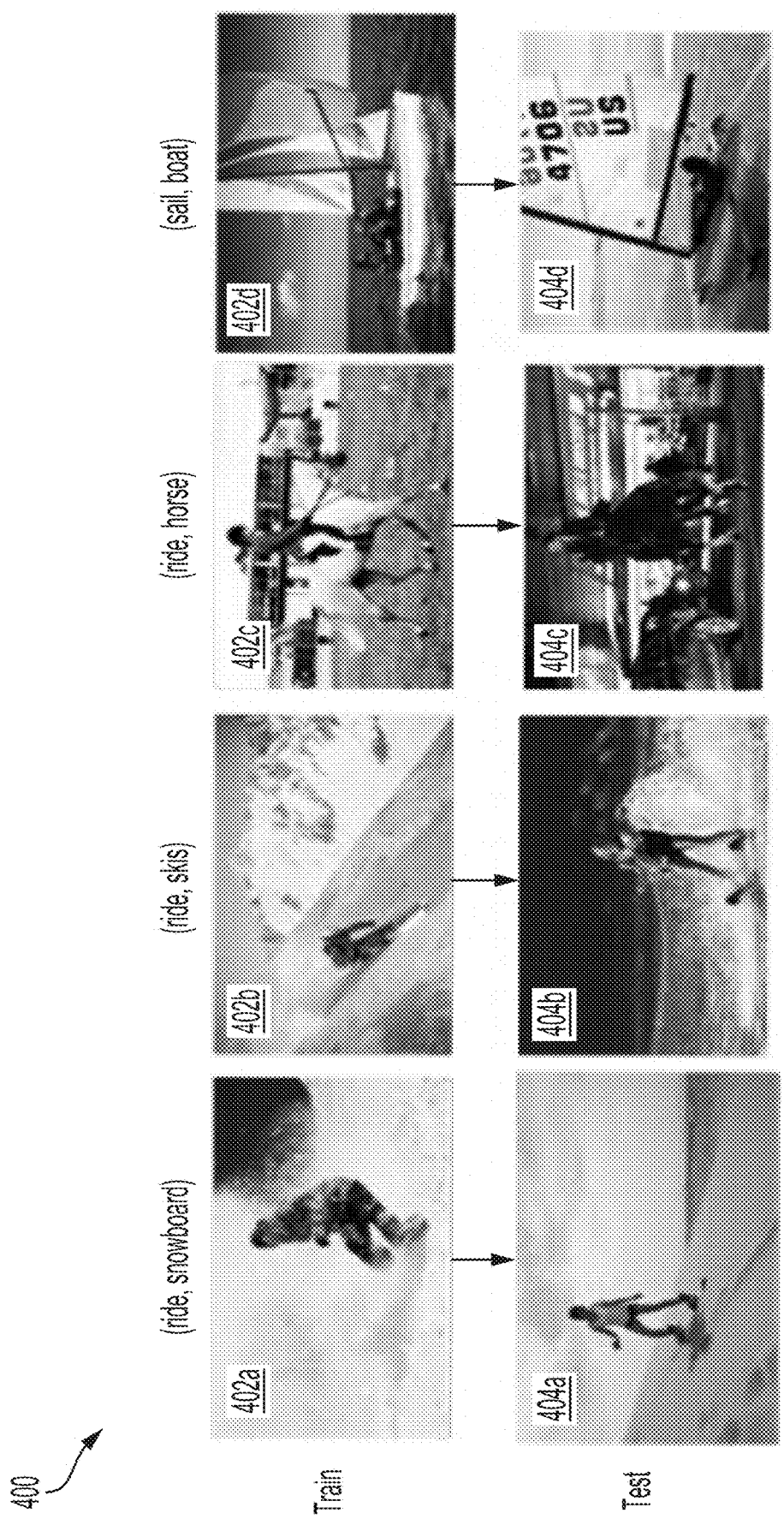
FIG. 4 illustrates examples of in-context images and out-of-context images in accordance with aspects of the present disclosure.

FIG. 4 illustrates examples of in-context images 402a-402d and out-of-context images 404a-404d according to aspects of the present disclosure. As discussed, an image interaction recognition model may learn interactions from in-context images 402a-402d. For example, a first in-context image 402a depicts snowboarding on a snowy mountain, a second in-context image 402b depicts skiing on a snowy mountain, a third in-context image 402c depicts riding a horse in an equestrian center, and a fourth in-context image 402d depicts sailing on water. The in-context images 402a-402d represent a subject-object interaction in a conventional context.

At test time, the image interaction recognition model may observe out-of-context interactions. For example, a first out-of-context image 404a depicts a snowboarder sliding on a sand dune. A conventional context for a snowboarder is a snowy mountain. As such, a snowboarder on a sand dune is not in context (e.g., out-of-context). In another example, a second out-of-context image 404b depicts skiing on water. A conventional context for a skiing is on a snowy mountain. As such, skiing on water is not in context.

In yet another example, a third out-of-context image 404c depicts riding a horse in a city. A conventional context for horse riding is in an equestrian center. As such, riding a horse in a city is not in context. In a further example, a fourth out-of-context image 404d depicts a sailboat sailing on ice. A conventional context for a sailboat is water. As such, a sailboat on ice is not in context.

According to aspects of the present disclosure, the image interaction recognition model identifies interactions from an image regardless of the image's context. The model may be trained with in-context images 402a-402d and the trained model may identify subject-object interactions in out-of-context images 404a-404d.

Figure 5:
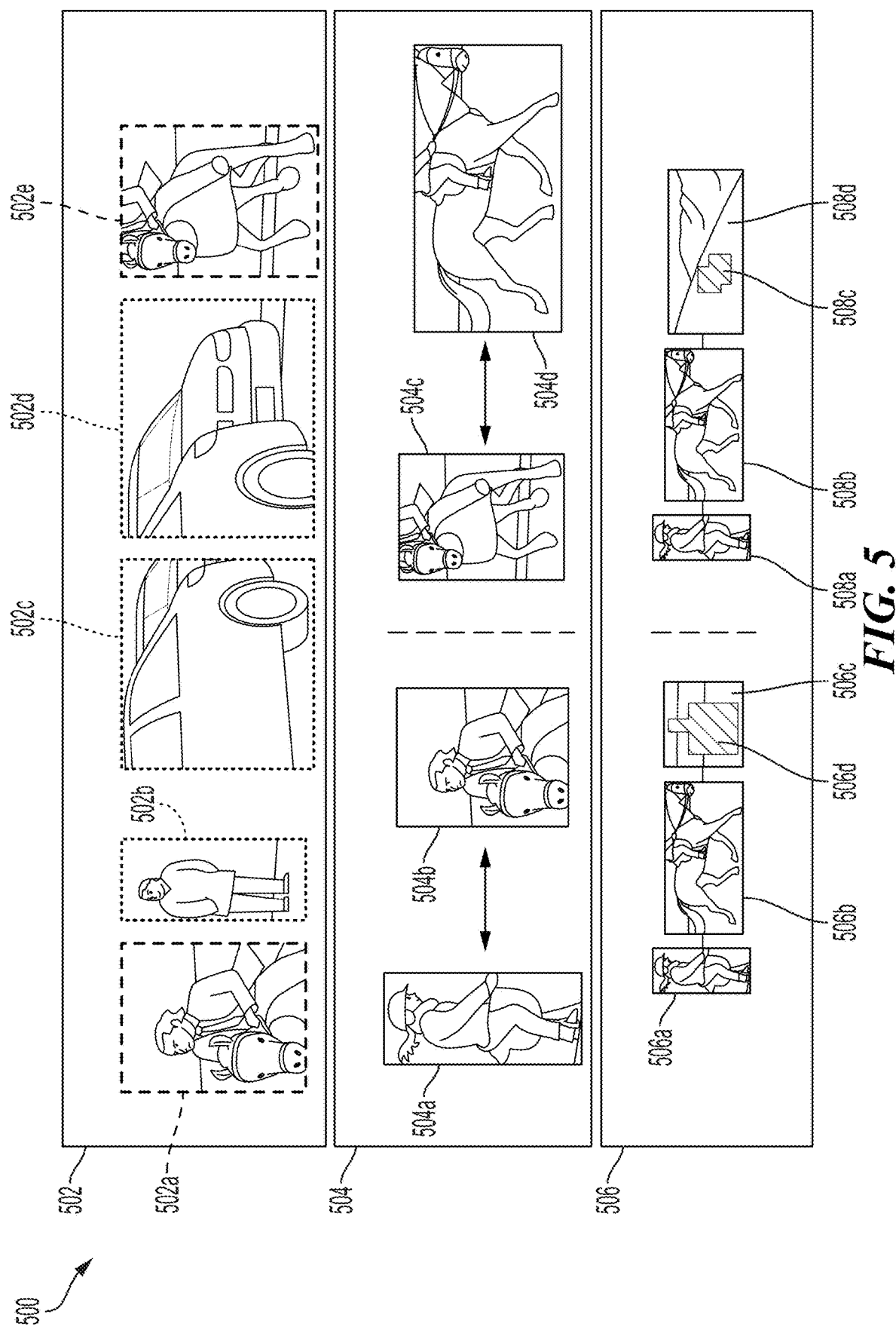
FIG. 5 illustrates an example of a model for classifying subject-object interactions from out-of-context images in accordance with aspects of the present disclosure.

FIG. 5 illustrates an image interaction recognition model 500 for classifying context-free subject-object interactions according to aspects of the present disclosure. The image interaction recognition model 500 may include a first framework 502, a second framework 504, and a third framework 506. Each framework 502, 504, 506 may be a different sub-network in a subject-object interaction classification model.

In one configuration, the first framework 502 identifies a subject and an object of an interaction, while ignoring bystanders. In some cases, a scene includes bystanders that were not observed with a subject-object pair during training. The bystanders may include humans and objects in various locations of the image, such as the background. The bystanders do not contribute to classifying the subject-object interaction. That is, the bystanders add unnecessary noise to the classification. Therefore, the first framework 502 distinguishes the subject and the object from the bystanders.

In the example of FIG. 5, the first framework 502 identifies subject-object interaction regions 502a, 502e of an input image and bystander regions 502b, 502c, 502d. As shown in FIG. 5, the subject-object interaction is horse-riding and the context is a city. The city context is atypical for a horse-riding interaction. Conventional systems may fail to classify the horse-riding interaction in an atypical context.

The second framework 504 obtains a context-free representation of a subject 504b and an object 504c identified in the first framework 502. The subject 504b and the object 504c may be referred to as a subject-object pair (504b, 504c). It is desirable to obtain representations of the subject-object pair (504b, 504c) that are robust to out-of-context scenes. In some cases, a context may modify a subject-object pair. For example, the context may modify a photographic viewpoint, illumination, scene pixels within a subject-object bounding box, and/or visible portions of a subject and/or an object. As an example, the context may occlude (e.g., hide) portions of a subject and/or an object.

To improve robustness, the image interaction recognition model 500 identifies image features that are invariant across different contexts of a same interaction. In FIG. 5, the interaction in the subject-object pair (504b, 504c) is horse-riding. In one configuration, the image interaction recognition model 500 is trained on subject-object pair training data (504a, 504d) to identify invariant image features of a horse-riding interaction. For example, the interaction recognition model 500 may be trained to identify one or more features of a horse or a horse rider that are invariant to context. As an example, a foot, horsetail, or saddle may be invariant to context. The invariant features learned from the subject-object pair training data (504a, 504d) may identify context-free subject-object representations in the subject-object pair (504b, 504c).

The third framework 506 identifies the relative weight of entities (e.g., subject, object, and context) of a subject-object-context triplet. In one configuration, the image interaction recognition model 500 dynamically adjusts weights of the subject, object, and/or context. The adjusted weights affect a final classification of the interaction.

As discussed, portions of a subject or an object may be occluded. For example, a horse in a river may be partially hidden. The third framework 506 identifies whether the context contributes to classifying the given subject-object pairs and/or whether only the subject and/or the object contribute to the classification. The context may contribute to the classification if the context corresponds to an in-context scene.

For example, for a first subject-object pair (506a, 506b), additional weight may be assigned to a first context 506c (e.g., equestrian center) because the first context 506c contributes to the classification. In contrast, for a second subject-object pair (508a, 508b), weights assigned to a second context 508d may be reduced because the second context 508d (e.g., a snowy environment) does not contribute to classifying the first subject-object pair (506a, 506b) (e.g., horse-riding). To focus on the first and second context 506c, 508d, areas 506d, 508c corresponding to the subject and the object may be masked from the first and second context 506c, 508d.

The relative importance of entities may be modeled with a weakly supervised sub-module that learns to weigh a subject-object-context triplet given an interaction classification. In one configuration, in-context interactions are manually augmented with out-of-context images to improve the process of weighing entities.

Figure 6:
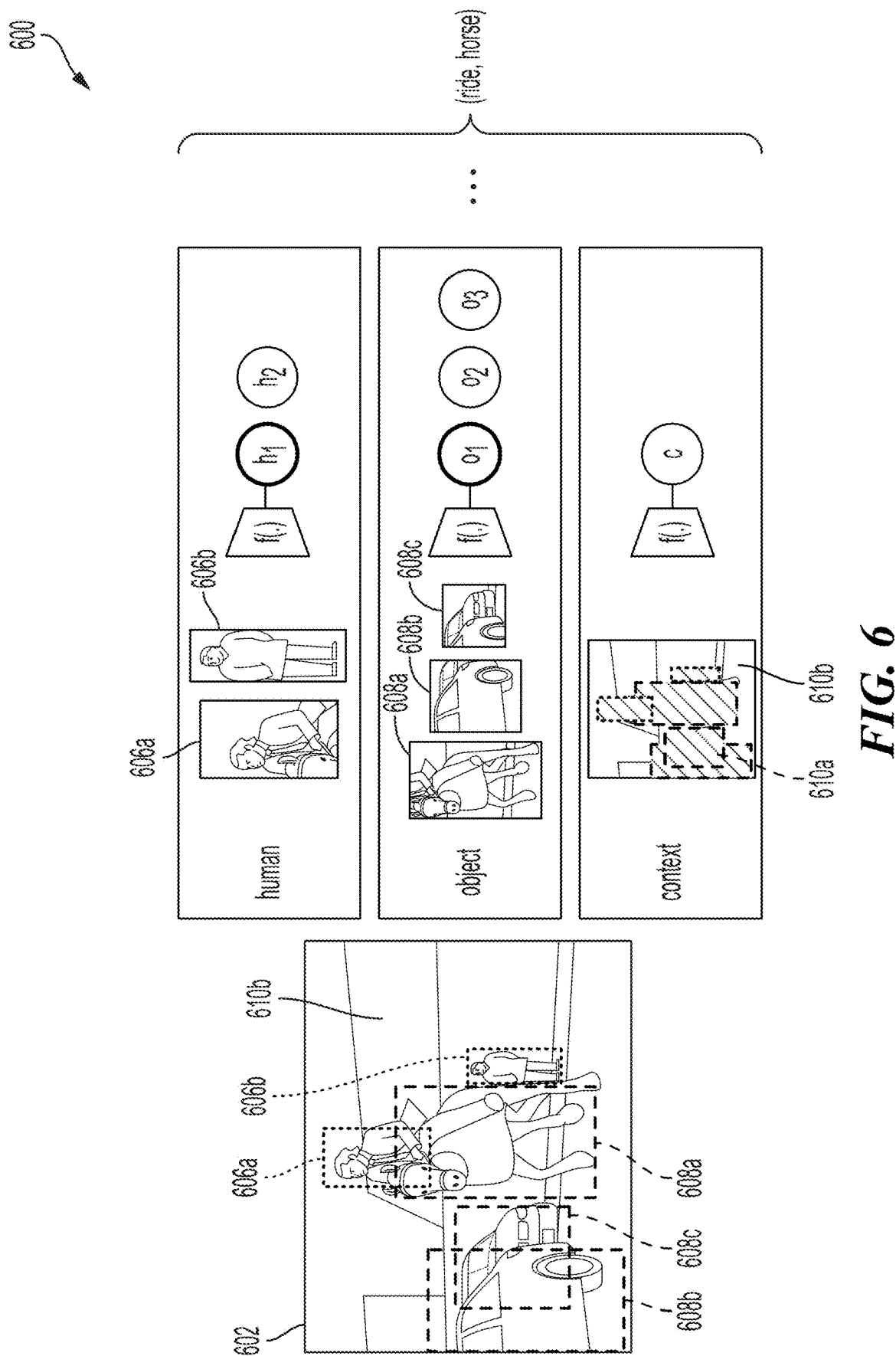
FIG. 6 illustrates an exemplary network that yields activations for each subject, object, and context region in accordance with aspects of the present disclosure.

As discussed, an input image may be classified according to subject-object pairs (e.g., human-object interaction class). The classification may be based on a combination of subject, object, and context features. FIG. 6 illustrates a model 600 for generating features for a subject region, object region, and context region according to aspects of the present disclosure. As shown in FIG. 6, the model 600 receives an image 602 depicting subject-object interaction. The input image 602 may be subdivided into subject regions 606a, 606b, object regions 608a, 608b, 608c, and a context region 610b.

An image feature function f(·) may generate a D-dimensional vector of features for each subject region 606a, 606b, object region 608a, 608b, 608c, and context region 610b. In the example of FIG. 6, the image feature function f(·) generates features $h_1$ and $h_2$ for the subject regions 606a, 606b, features $o_1$-$o_3$ for the object regions 608a, 608b, 608c, and features c for the context region 610b. Based on context-free image feature learning (see FIG. 7), the highest weighted features may be selected for the features of the subject and object.

In the current example, $h_1$ represents the subject and feature $o_1$ represents the object. For clarity, the subject features $h_1$ and object features of are bolded in FIG. 6. Features $h_2$ and $o_2$-$o_3$ represent bystanders. The features may also be referred to as activations of a feature function f(·).

In one configuration, the image feature function f(·) generate a D-dimensional vector of features via region-of-interest pooling. The pooling may be applied to a last layer before a classifier to obtain region-specific image features.

Each set of regions (e.g., subject regions 606a, 606b, object regions 608a, 608b, 608c, and a context region 610b) may be obtained by masking other regions from the image 602. For example, the subject regions 606a, 606b may be obtained by masking the object regions 608a, 608b, 608c and the context region 610b. A region may be masked by setting a value of the region to zero.

The masking disentangles regions. As such, model 600 may be prevented from leveraging a co-occurrence of entity regions. As shown in FIG. 6, an area 610a corresponding to the subject regions 606a, 606b and object regions 608a, 608b, 608c is masked from the context region 610b. The masked area 610a in the context region 610b may prevent the model 600 from leveraging the subject regions 606a, 606b and/or object regions 608a, 608b, 608c when determining features for the context region 610b. The improved disentanglement provides context-free representations of the subject regions 606a, 606b and object regions 608a, 608b, 608c, because the model does not observe the context region 610b.

Figure 7:
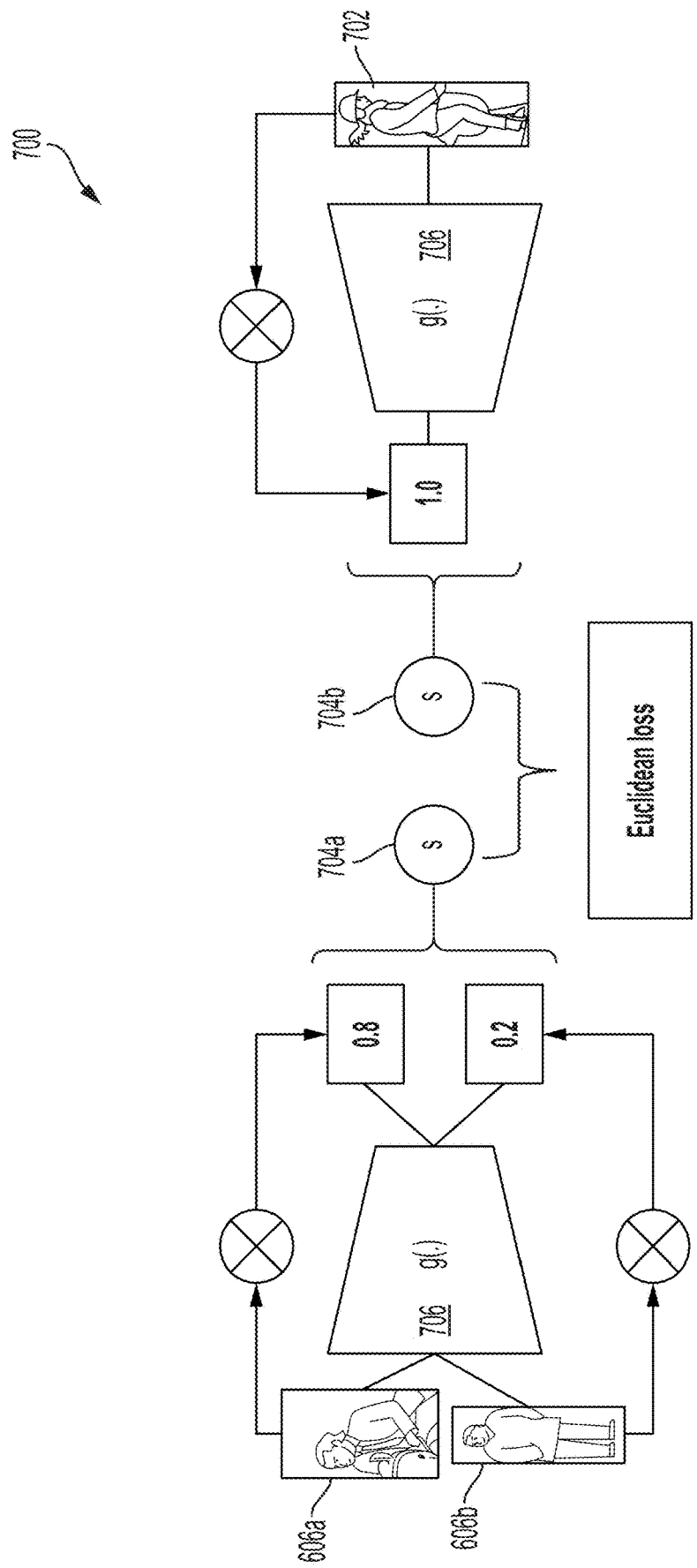
FIG. 7 illustrates an example of context-free image feature learning in accordance with aspects of the present disclosure.

FIG. 7 illustrates an example 700 of context-free image feature learning according to aspects of the present disclosure. In one configuration, for each image, features from a model are aggregated to obtain similar representations across different images of a same interaction. Aspects of the present disclosure discuss human-object interactions. Aspects of the present disclosure may also be applied to other interactors (e.g., other objects or creatures).

As discussed, a model yields a D-dimensional vector of features for each subject region ($h_i$), object region ($o_i$), and context region (c) per image. That is, D is based on a number of subject regions, object regions, and the context region. It may be unclear, in an image, which region(s) correspond to an interaction as opposed to bystanders and/or background objects. The obtained representation may be sensitive to context-specific transformations of the subject and object regions. Context-specific transformations may include, for example, changes in viewpoint, pose, and/or illumination. Thus, it is desirable to weigh subject or object features to improve the subject and/or object identification.

In one configuration, a sub-network g(·) receives the D-dimensional features of the subject regions ($h_i$) and object regions ($o_i$). The sub-network g(·) produces an N×1 (N being the number of detections) dimensional vector denoting a contribution of each region to the final response. A weighted aggregation of all subject or object features within the input may be determined based on the N×1-dimensional vector.

As shown in FIG. 7, subject regions 606a, 606b from an input image 602 of FIG. 6 that depict a human may be input to the sub-network g(·) 706. The sub-network g(·) 706 generates a weighted sum of the subject regions 606a, 606b. A training image 702 (e.g., target image) is sampled from a training set. The training image 702 depicts a same interaction and also a same subject or object as the subject regions 606a, 606b. For example, the training image 702 and subject regions 606a, 606b both depict humans and the interaction of one of the subject regions 606a is horse-riding.

The image feature function f(·) (not shown in FIG. 7) and the sub-network g(·) 706 may be applied to the training image 702. This training image 702 may have a different context from a context of the subject regions 606a, 606b, resulting in different subject and object appearances. Still, the training image 702 and subject regions 606a, 606b share a same subject and object.

During training, a Euclidean loss is determined between outputs 704a, 704b of each sub-network g(·) 706. The outputs 704 may be canonical representations. The loss enforces a similarity of weighted aggregations of subject and object activations across different contexts of the same interaction. That is, the sub-network g(·) 706 is trained to assign higher weights (e.g., probabilities) to the first region 606a based on a similarity with the training image 702. The similarity is determined from a similarity of the subject and the interaction of the first region 606a and the training image 702. By adjusting weights of regions, similar representations of a subject-object may be identified across different contexts. Thereby providing context-free representations.

Based on the weakly supervised training of FIG. 7, the model learns to appropriately reduce weights for a bystander. For example, as shown in FIG. 7, the bystander of a second subject region 606b is given a weight of 0.2. In contrast, the subject of the interaction in the first subject region 606a is given a weight of 0.8. The training image 702 is a ground-truth image and has a weight of 1. The weights are adjusted so that a representation of the first subject region 606a is similar to a representation of the training image 702.

That is, although the context of the first subject region 606a is different from the context of the training image 702, the subjects of both the first subject region 606a and the training image 702 are similar (e.g., human riding a horse). The bystander of a second subject region 606b is not similar to the subject of the training image 702. Therefore, by comparing the loss, the network learns to give the bystander of a second subject region 606b a lower weight. The weakly supervised training of FIG. 7 may also be applied to objects.

In one aspect, the sub-network g(·) 706 is implemented as a one-layer neural network of size D×1. The output of the sub-network g(·) 706 modulates the subject or object representations of size (N×D) with an inner product ((N×D)×(D×1)). The inner product may be mean-pooled across a first dimension to obtain a (D×1)-dimensional feature representation of the input image for a subject-object pair.

A softmax function may be applied to the weight activations of the subject or object representations. By applying the function activation, a weight activation for the subject or object may be set to one. For example, the weighted activations may assign higher values to real subject-object pairs of the interaction in comparison to the values associated with other subjects of objects (e.g., bystanders).

Entity re-weighting may improve the context-free classification. For context-free classification, the subject, object, and context are jointly detected. The model obtains representations of the human, object, and context regions, and aggregates subject or object representations, such that they are similar across different scenes. This yields a three-dimensional (3D) vector of activations for each image, summarizing the subject, object, and context appearance in the input.

In one aspect of the present disclosure, given that observations may be subject-object-context triplets, the informative inputs are dynamically determined for the final classification. That is, the model dynamically re-weights the subject, object, and context to obtain the final classification decision for the input image.

Figure 8:
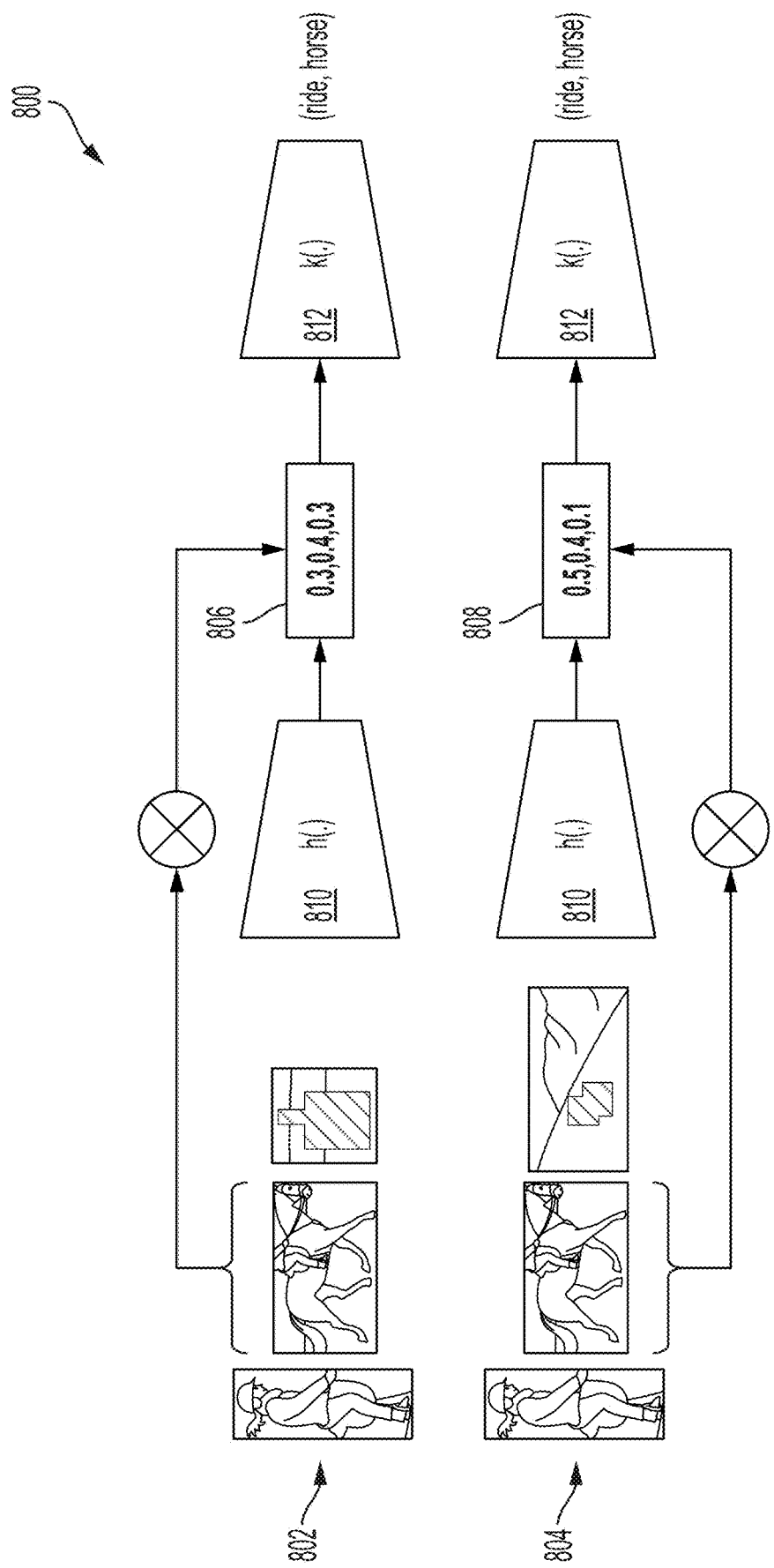
FIG. 8 illustrates an exemplary framework for identifying subject-object-context image features for classification in accordance with aspects of the present disclosure.

FIG. 8 illustrates a framework 800 for identifying subject-object-context image features for classification according to aspects of the present disclosure. The framework 800 identifies a relative weight of subject-object-context triplets 802, 804 for classification. A (3,1)-dimensional vector may represent a relative importance of the subject-object-context triplets 802, 804 for classification. The framework 800 may be implemented before a classification procedure.

As shown in FIG. 8, a subject-object-context triplet 802, 804 is generated for an entity weighting module h(·) 810. In one configuration, the entity weighing module h(·) 810 receives three (3×D)-dimensional image features of a subject-object-context triplet 802, 804 and produces a (3×1)-dimensional vector representing a relative importance of a subject, object, and context for the classification. Because the model observes subject-objects coupled with a regular context, the model may not learn to suppress a contribution of the context when it is not informative for the observed interaction (e.g., a snowy mountain for the riding horse interaction). To suppress the contribution of a non-information context, the model relies on surprise context mining.

In surprise context mining, given the image features of a subject-object (e.g., a horse rider and the horse), the original context is replaced by sampling a context feature from a different interaction image (e.g., snowboarding). The entity weighing module h(·) 810 produces an input vector for a classification module k(·) 812, such that, when the subject, object, and the context are combined, the correct classification is obtained via the classification module k(·) 812.

The surprise context mining is performed during training to simulate a surprising subject-object-context triplet. As a result of the training, the model learns an improved notion of dynamic weighting. To that end, the entity weighing module h(·) 810 learns to recognize the out-of-context subject-object pairs, and assigns a lower weight to the context in comparison to the regular context (e.g., a jockey club). Example values 806, 808 for the importance of subject-object-context for the classification accuracy are shown in FIG. 8. This final re-weighted representation is input to the classifier to label the input image.

For example, a first subject-object-context triplet 802 of horse riding at an equestrian center may have relative weights 806 corresponding to the subject (0.3), the object (0.4), and the context (0.3). A second subject-object-context triplet 804 of horse riding on a snowy mountain may have relative weights 808 corresponding to the subject (0.5), the object (0.4), and the context (0.1). In this example, a horse on a snowy mountain may be considered out-of-context. Therefore, the context of snowy mountain horse-riding is de-emphasized (relative weight 0.1) relative to equestrian center horse-riding, where the relative weight of the context is 0.3. The emphasis for the snowy mountain horse-riding is placed on the subject for the second subject-object-context triplet 804. For example, the relative weight (0.5) of the subject of the second subject-object-context triplet 804 is increased relative to the relative weight (0.3) of the subject of the first subject-object-context triplet 802. Softmax function is applied so that the sum of all importance values is 1 (e.g., 0.5+0.4+0.1=1).

Figure 9:
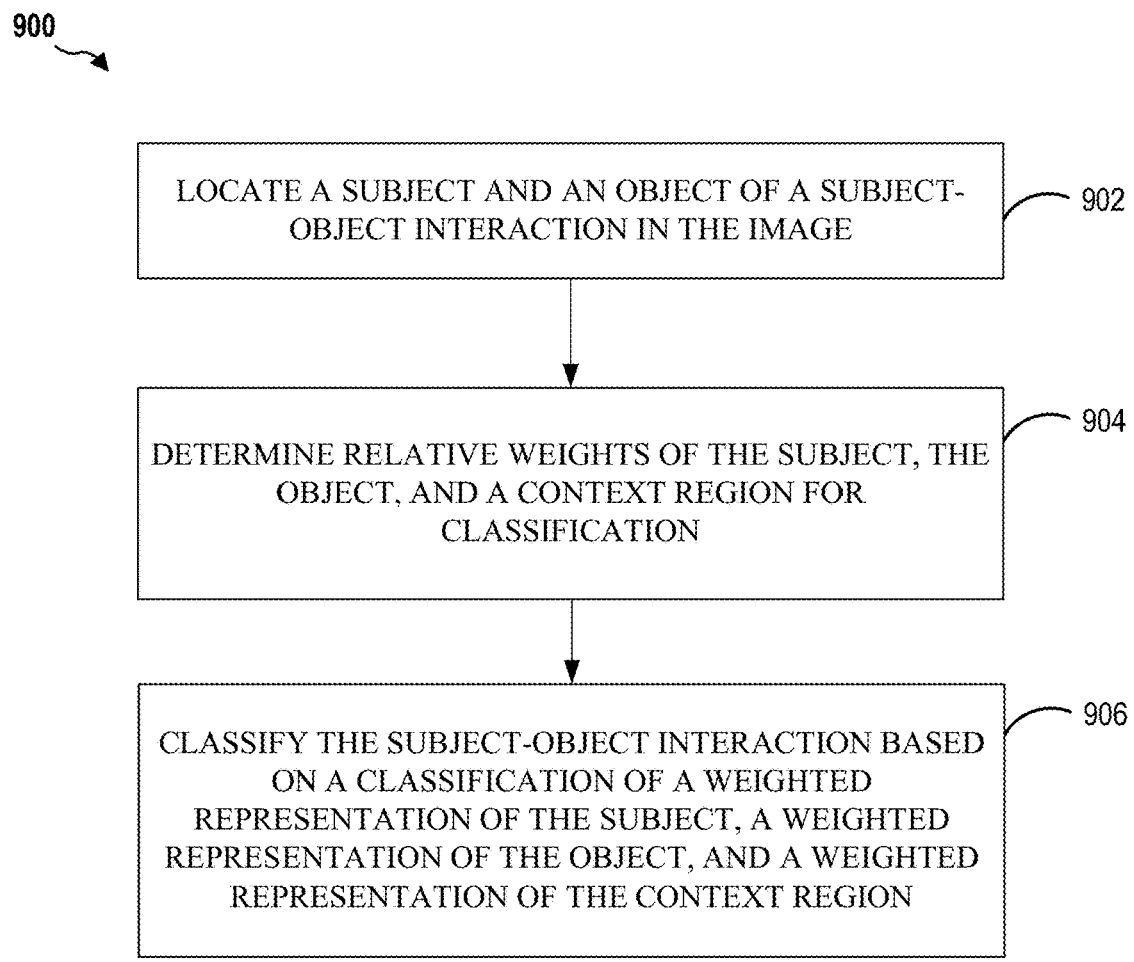
FIG. 9 illustrates a flow diagram for a method for classifying subject-object interaction from an image in accordance with aspects of the present disclosure.

FIG. 9 illustrates a method 900 according to an aspect of the present disclosure. As shown in FIG. 9, a neural network locates a subject and an object of a subject-object interaction in the image (block 902). In one configuration, the neural network ignores bystanders and/or background objects. The image may be an out-of-context image. Additionally, the subject may be identified as a human.

In one configuration, the neural network receives a subject-only image region, an object-only image region, and a context-only image region. The neural network may generate image features corresponding to each subject, object, and context region. The neural network may be trained to represent the subject and the object in a context-free manner, and to localize the subject and the object based on the learning. That is, the neural network may obtain context-free subject and object representations of the image As shown in FIG. 9, the neural network determines relative weights of the subject, the object, and a context region for classification (block 904). In an optional configuration, the neural network masks the subject-only image region and the object-only image region to obtain the context-only image region; masks the subject-only image region and the context-only image region to obtain the object-only image region; and masks the context-only image region and the object-only image region to obtain the subject-only image region. The relative weights of the subject, object, and the context region may be based on a relative importance to the subject-object interaction classification, the relative importance determined based on the image features As shown in FIG. 9, the neural network classifies the subject-object interaction based on a classification of a weighted representation of the subject, a weighted representation of the object, and a weighted representation of the context region (block 906). That is, an entity weighing module produces an input vector of weights for the object, the subject, and the context region. A classification module classifies a weighted context-free object, a weighted context-free subject, and a weighted context region, where the weights are obtained from the entity weighing module. The correct classification is obtained via the classification module when the weighted context-free object, the weighted context-free subject, and the weighted context region are combined.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for processing an image by an image classification model, comprising:
    locating a subject and an object of a subject-object interaction in the image;
    determining a scene context indicating a type of location where the subject-object interaction occurs;
    determining, for classification of the subject-object interaction, relative weights of the subject, the object, and the scene context based on whether a subject-object context associated with the subject-object interaction corresponds to scene context; and
    classifying the subject-object interaction based on a classification of a weighted representation of the subject, a weighted representation of the object, and a weighted representation of the scene context, the weighted representation of each of the subject, the object, and the scene context being based on respective relative weights of the subject, the object, and the scene context.

2. The method of claim 1, in which the subject-object interaction is out-of-context.

3. The method of claim 1, in which the subject is identified as a human.

4. The method of claim 1, further comprising:
    learning to represent the subject and the object in a context-free manner; and
    localizing the subject and the object based on the learning.

5. The method of claim 1, further comprising:
    receiving, at a convolutional neural network associated with the image classification model, a subject-only image region, an object-only image region, and a context-only image region; and
    generating, by the convolutional neural network, image features corresponding to each one of the subject-only image region, the object-only image region, and the context-only image region.

6. The method of claim 5, further comprising:
    masking the subject-only image region and the object-only image region to obtain the context-only image region;
    masking the subject-only image region and the context-only image region to obtain the object-only image region; and
    masking the context-only image region and the object-only image region to obtain the subject-only image region.

7. The method of claim 5, further comprising determining the relative weights of the subject, the object, and the scene context based on a relative importance to the subject-object interaction classification, the relative importance determined based on the image features.

8. An apparatus for processing an image by an image classification model, comprising:
    a memory; and
    at least one processor coupled to the memory, the at least one processor configured:
        to locate a subject and an object of a subject-object interaction in the image;
        to determine a scene context indicating a type of location where the subject-object interaction occurs;
        to determine, for classification of the subject-object interaction, relative weights of the subject, the object, and the scene context based on whether a subject-object context associated with the subject-object interaction corresponds to scene context; and
        to classify the subject-object interaction based on a classification of a weighted representation of the subject, a weighted representation of the object, and a weighted representation of the scene context, the weighted representation of each of the subject, the object, and the scene context being based on respective relative weights of the subject, the object, and the scene context.

9. The apparatus of claim 8, in which the subject-object interaction is out-of-context.

10. The apparatus of claim 8, in which the subject is identified as a human.

11. The apparatus of claim 8, in which the at least one processor is further configured:
    to learn to represent the subject and the object in a context-free manner; and
    to localize the subject and the object based on the learning.

12. The apparatus of claim 8, in which the at least one processor is further configured:
    to receive, at a convolutional neural network associated with the image classification model, a subject-only image region, an object-only image region, and a context-only image region; and
    to generate, by the convolutional neural network, image features corresponding to each one of the subject-only image region, the object-only image region, and the context-only image region.

13. The apparatus of claim 12, in which the at least one processor is further configured:
    to mask the subject-only image region and the object-only image region to obtain the context-only image region;
    to mask the subject-only image region and the context-only image region to obtain the object-only image region; and
    to mask the context-only image region and the object-only image region to obtain the subject-only image region.

14. The apparatus of claim 12, in which the at least one processor is further configured to determine the relative weights of the subject, the object, and the scene context based on a relative importance to the subject-object interaction classification, the relative importance determined based on the image features.

15. An apparatus for processing an image by an image classification model, comprising:
    means for locating a subject and an object of a subject-object interaction in the image;
    means for determining a scene context indicating a type of location where the subject-object interaction occurs;
    means for determining, for classification of the subject-object interaction, relative weights of the subject, the object, and the scene context based on whether a subject-object context associated with the subject-object interaction corresponds to scene context; and
    means for classifying the subject-object interaction based on a classification of a weighted representation of the subject, a weighted representation of the object, and a weighted representation of the scene context, the weighted representation of each of the subject, the object, and the scene context being based on respective relative weights of the subject, the object, and the scene context.

16. The apparatus of claim 15, in which the subject-object interaction is out-of-context.

17. The apparatus of claim 15, in which the subject is identified as a human.

18. The apparatus of claim 15, further comprising:
    means for learning to represent the subject and the object in a context-free manner; and
    means for localizing the subject and the object based on the learning.

19. The apparatus of claim 15, further comprising:
    means for receiving, at a convolutional neural network associated with the image classification model, a subject-only image region, an object-only image region, and a context-only image region; and
    means for generating, by the convolutional neural network, image features corresponding to each one of the subject-only image region, the object-only image region, and the context-only image region.

20. The apparatus of claim 19, further comprising:
    means for masking the subject-only image region and the object-only image region to obtain the context-only image region;
    means for masking the subject-only image region and the context-only image region to obtain the object-only image region; and
    means for masking the context-only image region and the object-only image region to obtain the subject-only image region.

21. The apparatus of claim 19, further comprising means for determining the relative weights of the subject, the object, and the scene context based on a relative importance to the subject-object interaction classification, the relative importance determined based on the image features.

22. A non-transitory computer-readable medium having program code recorded thereon for processing an image by an image classification model, the program code executed by a processor and comprising:
    program code to locate a subject and an object of a subject-object interaction in the image;
    program code to determine a scene context indicating a type of location where the subject-object interaction occurs;
    program code to determine, for classification of the subject-object interaction, relative weights of the subject, the object, and the scene context based on whether a subject-object context associated with the subject-object interaction corresponds to scene context; and
    program code to classify the subject-object interaction based on a classification of a weighted representation of the subject, a weighted representation of the object, and a weighted representation of the scene context, the weighted representation of each of the subject, the object, and the scene context being based on respective relative weights of the subject, the object, and the scene context.

23. The non-transitory computer-readable medium of claim 22, in which the subject-object interaction is out-of-context.

24. The non-transitory computer-readable medium of claim 22, in which the subject is identified as a human.

25. The non-transitory computer-readable medium of claim 22, in which the at least one processor is further configured:
    to learn to represent the subject and the object in a context-free manner; and
    to localize the subject and the object based on the learning.

26. The non-transitory computer-readable medium of claim 22, in which the at least one processor is further configured:
    to receive, at a convolutional neural network associated with the image classification model, a subject-only image region, an object-only image region, and a context-only image region; and
    to generate, by the convolutional neural network, image features corresponding to each one of the subject-only image region, the object-only image region, and the context-only image region.

27. The non-transitory computer-readable medium of claim 26, in which the at least one processor is further configured:
    to mask the subject-only image region and the object-only image region to obtain the context-only image region;
    to mask the subject-only image region and the context-only image region to obtain the object-only image region; and
    to mask the context-only image region and the object-only image region to obtain the subject-only image region.

28. The non-transitory computer-readable medium of claim 26, in which the at least one processor is further configured to determine the relative weights of the subject, the object, and the scene context based on a relative importance to the subject-object interaction classification, the relative importance determined based on the image features.

* * * * *